United States Patent [19]
Boslough

[11] 3,944,079
[45] Mar. 16, 1976

[54] CLAMPABLE BICYCLE STAND
[75] Inventor: James Boslough, Denver, Colo.
[73] Assignee: The Raymond Lee Organization, Inc., New York, N.Y. ; a part interest
[22] Filed: Feb. 3, 1975
[21] Appl. No.: 546,496

[52] U.S. Cl. .......................... 211/5; 70/234; 211/22
[51] Int. Cl.² ..................... E05B 73/00; E05B 67/38
[58] Field of Search ............... 211/5, 17, 18, 19, 20, 211/21, 22; 70/10, 233, 234, 235

[56] References Cited
UNITED STATES PATENTS

| | | | |
|---|---|---|---|
| 636,629 | 11/1899 | Butcher | 211/5 |
| 639,517 | 12/1899 | Butcher | 211/5 |
| 1,353,541 | 9/1920 | Retterer | 70/18 |
| 1,481,537 | 1/1924 | Carney | 70/18 |
| 3,800,570 | 4/1974 | Kaplan | 70/18 |
| 3,805,564 | 4/1974 | Velardo | 70/18 |

FOREIGN PATENTS OR APPLICATIONS

| | | | |
|---|---|---|---|
| 240,704 | 4/1946 | Switzerland | 211/22 |
| 67,663 | 9/1948 | Denmark | 211/5 |

*Primary Examiner*—Roy D. Frazier
*Assistant Examiner*—Robert W. Gibson, Jr.
*Attorney, Agent, or Firm*—Howard I. Podell

[57] ABSTRACT

A bicycle stand which holds a bicycle upright in place, and to which the bicycle may be locked. An upright member, embedded in cement, or anchored to a base plate, has an arm pinned hingeably, with parallel plates welded on each side of the arm that project past the free end of the arm. A U-shaped bracket is hinged to one plate, which may be passed about a frame member of a bicycle and fitted into a slot in the plate, with holes in the bracket for fastening the shackle of a lock, with the lock shackle completely enclosed by the two parallel plates in the latched position.

1 Claim, 4 Drawing Figures

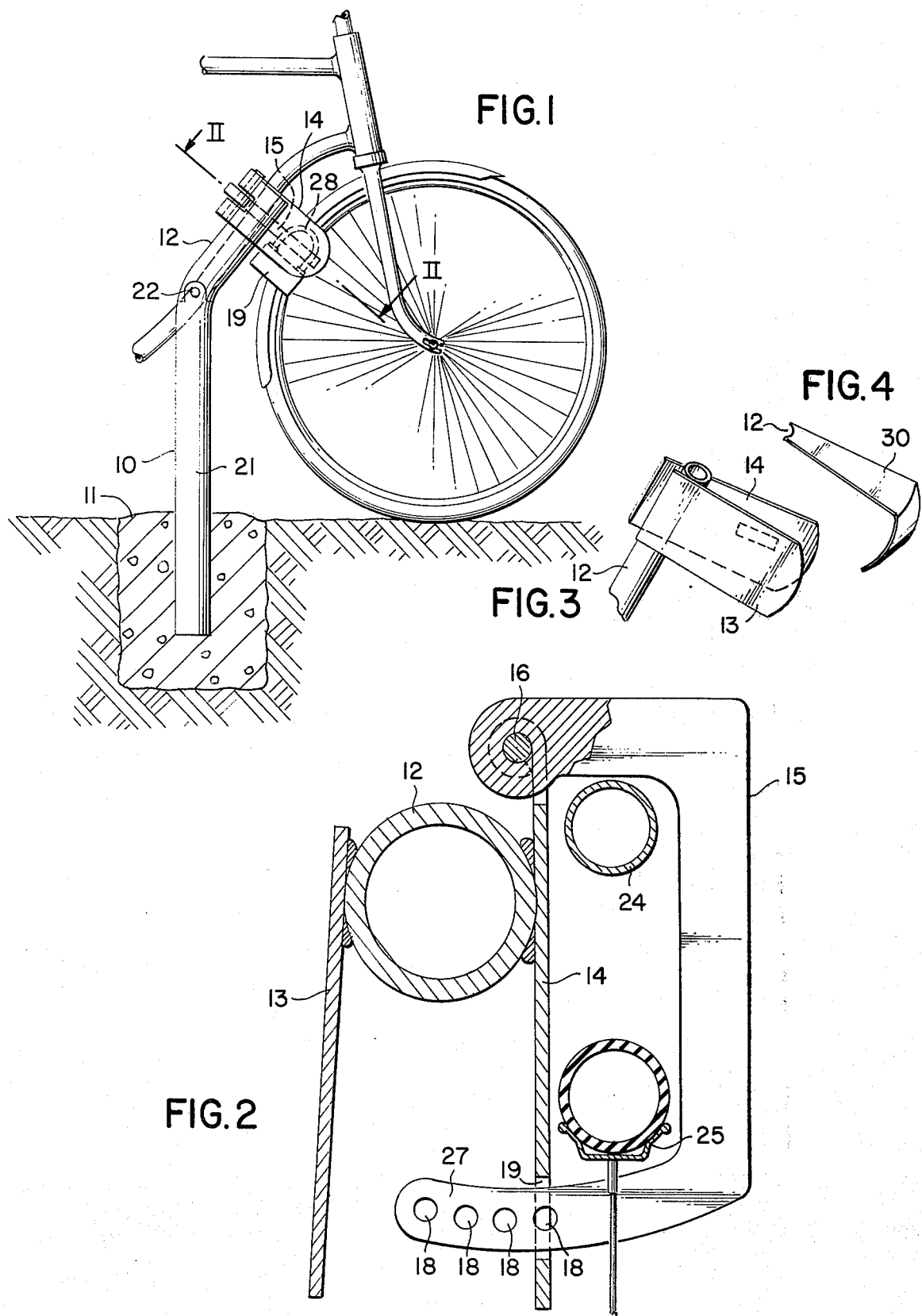

CLAMPABLE BICYCLE STAND

SUMMARY OF THE INVENTION

My invention relates to a bicycle stand, and particularly to a bicycle stand which holds a bicycle upright in place, and to which the bicycle may be locked.

An upright member embedded in cement, or anchored to a base plate, has an arm pinned hingeably, with parallel plates welded on each side of the arm that project past the free end of the arm. A U-shaped bracket is hinged to one plate, which may be passed about a frame member of a bicycle and fitted into a slot in the plate, with holes in the bracket for fastening the shackle of a lock, with the lock shackle completely enclosed by the two parallel plates in the latched position.

BRIEF DESCRIPTION OF THE DRAWINGS

The objects and features of the invention may be understood with reference to the following detailed description of an illustrative embodiment of the invention, taken together with the accompanying drawings in which:

FIG. 1 is an elevation view of the bicycle stand;

FIG. 2 is a section of the stand taken along line II—II of FIG. 1;

FIG. 3 is a detail in perspective view of the hinged arm and plate; and

FIG. 4 is a detail in perspective view of an alternate form of the lock protector plate.

DESCRIPTION OF THE PREFERRED EMBODIMENT

Turning now descriptively to the drawings, in which similar reference characters denote similar elements throughout the several views, FIGS. 1-3 illustrate the bicycle stand 10 which may be embedded in a concrete base 11. A vertical upright member 21 fastened to the base is hingeably fastened by a pin 22 to an arm member 12 in the form of a tube. Two generally parallel plates 13 and 14 are welded to the opposite sides of the free end of arm member 12. A U-shaped bracket 15 is pivotably fastened by pin 16 to one plate 14 and shaped to fit about a frame member 24 or the wheel rim 25 of a bicycle with the free end of bracket 15 fitting through a slot 17 in plate 14. Through holes 18 are formed in the end section 27 of bracket 15 of a size to retain the shackle 28 of a lock 19. Lock 19 is protected from abuse, and particularly from attempts to cut lock shackle 28 when installed since the shackle fits in the locked position between parallel plates 13 and 14.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters Patent of the United States is:

1. A bicycle stand for retaining a bicycle in a locked position with the shackles of the lock protected from removal in the locked position, comprising a base member adaptable for mounting along a vertical axis, an arm member fastened to the base member, with a pair of plates, spaced apart from each other, fitted to the arm member, said spacing being of a size to fit about a lock, with a U-shaped bracket pivotably fixed to the arm member so that the bracket may go about a section of a bicycle frame or wheel, with a free end section of the bracket passing through a slot in one of the said plates so that said free end section of the bracket lies between the two said plates in the latched position of the bracket, said free end of the bracket formed with one or more holes of a size to fit a shackle of a lock, in which the two plates are of a size to completely enclose both sides of the lock shackle of a lock which is fastened through a hole of the bracket in the latched position of the bracket and in which the arm member is pivotably fastened to the base member to rotate in a plane parallel to the axis of the base member by hinge means, so that the arm member may be rotated into a position to enable the bracket to fit about a section of a bicycle frame or wheel of a bicycle which is standing adjacent to the base member, for a wide range of bicycle sizes.

* * * * *